Patented Sept. 20, 1938

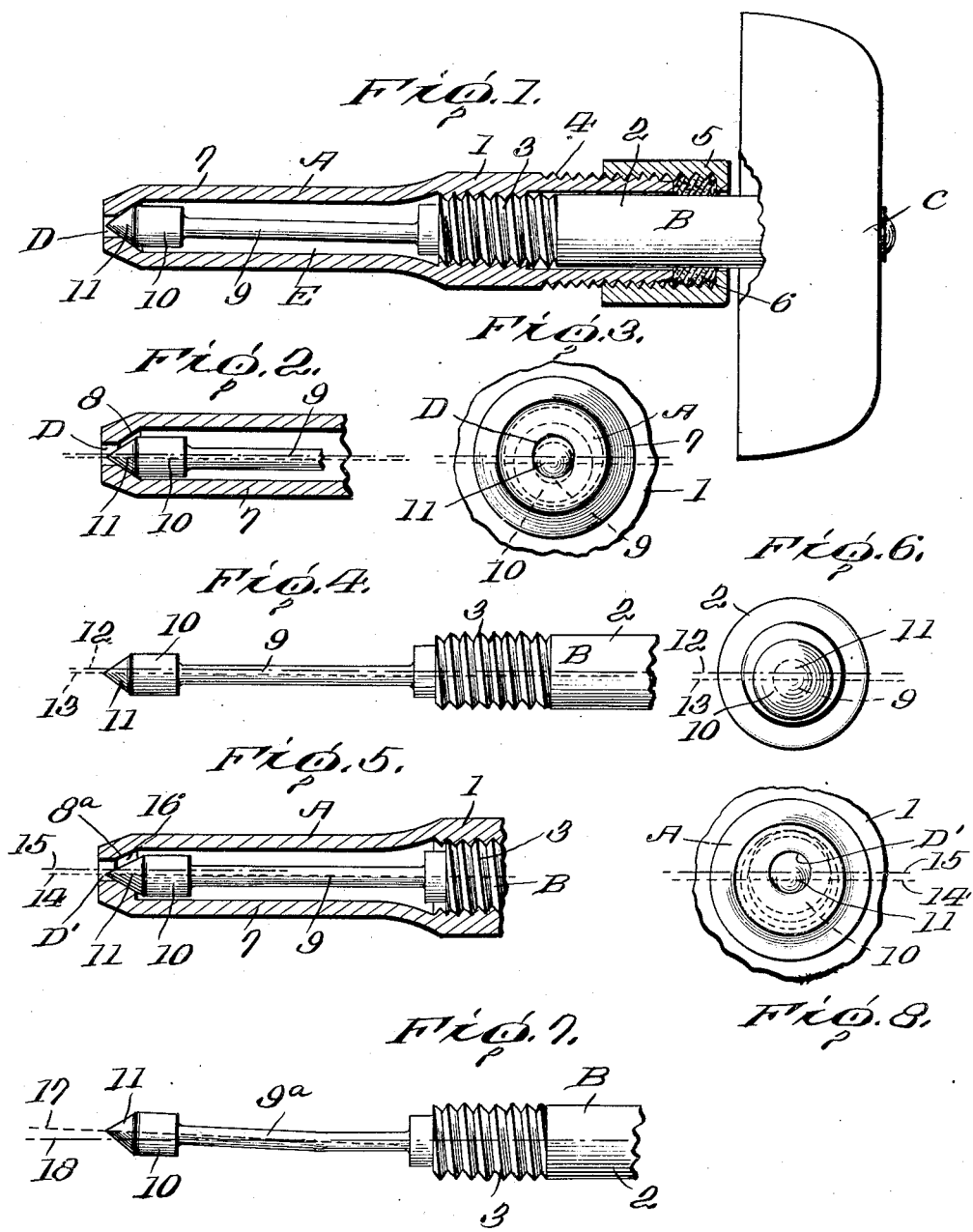

2,130,955

UNITED STATES PATENT OFFICE 2,130,955

VALVE

Rudolph Hoffman, Rocky River, Ohio, assignor to American Stove Company, St. Louis, Mo., a corporation of New Jersey Application August 26, 1937, Serial No. 161,149

3 Claims. (Cl. 251—29)

This invention relates to an improved valve and is directed more particularly and specifically to a valve for use in the fuel line of a liquid fuel burner, heater, or the like.

The primary object of the invention is to provide a valve which has a superior operation when the valve is just barely open to permit the flow of a very restricted amount of liquid through the valve.

A further and more specific object of this invention is to take the ordinary tapered valve and tapered valve seat, and so arrange them as to produce results that are new to them, viz: enabling the ordinary rotatable tapered valve, an ordinary stationary tapered valve seat and so arrange them that they are eccentric to each other, thereby enabling a fine control of the generated vapor and by the same arrangement cause the said rotatable tapered valve when opened and closed to engage different parts of said valve seat by rolling thereon and thereby preventing the accumulation of the ordinary carbonaceous matter and other foreign matter by cleaning and scouring the said valve seat at different parts thereof.

The other objects, novel features of construction and improved results of the valve will appear in detail from the following description when read in the light of the accompanying drawing.

In the drawing:

Fig. 1 is a longitudinal vertical sectional view through a valve built in accordance with the present invention.

Fig. 2 is a fragmentary, vertical sectional view of the valve appearing in Fig. 1, the valve being in a partly open position.

Fig. 3 is an end view with the needle valve in the position illustrated in Fig. 2 of the drawing.

Fig. 4 is a fragmentary view in side elevation of the needle valve appearing in Figs. 1 to 3 inclusive of the drawing.

Fig. 5 is a fragmentary view in longitudinal vertical section of a modified form of the invention.

Fig. 6 is an end view of the needle valve in the position illustrated in Fig. 5 of the drawing.

Fig. 7 is a fragmentary view in side elevation of a still further modified form of the invention.

Fig. 8 is an end view of the valve appearing in Fig. 7 of the drawing.

Having reference now to Figs. 1 to 4 inclusive of the drawing which illustrates the preferred embodiment of the invention, A designates a valve housing; B the valve stem; C the handle for manually operating the valve stem, and D the outlet orifice of the valve housing.

The valve housing is preferably of tubular form and comprises an enlarged rear end portion 1 which is internally threaded to rotatably receive the main enlarged portion 2 of the valve stem which is provided at its end with threads 3 having engagement with the internal threads of the housing. At its rear end the enlarged portion 1 of the housing is externally threaded as at 4 to receive a packing nut 5 provided with suitable packing material 6.

The valve housing comprises also a reduced tubular portion 7 which at its front end is provided with the aforementioned outlet orifice D. The reduced portion 7 of the valve housing provides a chamber E to which the fuel, or other liquid to be controlled, is suitably delivered from any suitable source in a manner common and well understood by those skilled in the art. The aforementioned outlet orifice D communicates with the chamber E and the chamber at its point of communication with the orifice is provided with a tapered seat 8.

The main valve stem 2 is provided with an extending portion 9 which is materially reduced as to diameter and this reduced stem portion is provided with a head 10 the outer end 11 of which is conical in form to provide a needle valve for cooperation with the tapered valve seat 8 and the outlet orifice D.

In controlling the flow of fuel to a liquid fuel burner or heater it is often desirable to provide a low fire and this is accomplished by the adjustment of the valve in a manner to permit the delivery of only a very small amount of fuel to the burner. When the valve is adjusted to accomplish this result it is commonly referred to as being "cracked" slightly. This means that the conical end constituting the needle valve is adjusted by rotation of the operating handle C so that the needle is slightly off of the tapered seat which will permit a very small amount of fuel to pass between the needle and the seat outwardly through the orifice D. In valves as now known and used the conical head or needle of the valve is equally removed or equally spaced from all sides or portions of the tapered seat with the result that if there are any impurities in the fuel such as dust, grit or perhaps wax which is present in certain fuels, this foreign matter has been found to retard the flow of the liquid through the valve with the result that the flame at the burner does not remain of the size to which it was originally set and oftentimes the passageway around the needle valve becomes sufficiently clogged as to permit such a small amount of fuel to pass that the flame at the burner becomes extinguished. If the flame at the burner becomes extinguished this will result in a flooding of unburned fuel which is not only undesirable from the standpoint of cleanliness but is highly dangerous as will be readily recognized.

The present invention has been devised to overcome the foregoing deficiencies of valves as heretofore made, and in accomplishing this result in the preferred embodiment of the invention as illustrated in Figs. 1 to 4 inclusive of the drawing, an eccentric motion or action is provided for the needle valve.

In operation said eccentric motion of the valve causes it to engage different parts of the tapered seat when the valve is open and closed, thereby causing a rolling, cleaning and scouring action on said different parts of the valve seat which thereby prevents the accumulation of the well-known carbonaceous and other objectionable foreign matter.

To accomplish the eccentric action it will be seen, by reference to Figs. 1 to 4 of the drawing, that the reduced valve stem portion 9 is eccentrically connected to the main valve stem portion 2. In these figures of the drawing the axis or center of the main valve stem portion 2 is designated at 12 while the axis or center of the reduced stem portion 9 is designated at 13. It will be seen that these axes are parallel but out of alignment and furthermore it will be seen that the center or axis of the conical needle-like portion of the valve stem head 10 is also eccentric to the main valve stem portion 2. The center of the outlet orifice D and of the tapered seat 8 is co-axial with the main valve stem portion 2.

With the parts constructed in the manner described it will be seen by reference to Fig. 1 of the drawing that when the valve is completely closed the reduced valve portion 9 is slightly bowed. Inasmuch as the valve seat and the needle valve are slightly out of alignment it will be readily recognized that the reduced valve stem portion 9 must yield slightly to permit a complete and tight closure of the valve. With the valve handle rotated slightly so as to "crack" the valve open the positions which the parts assume in respect to one another is illustrated in Fig. 2 of the drawing where it will be seen that the eccentric motion imparted to the needle valve as it is retracted slightly from its seat has caused the needle valve to move away from one side of the tapered seat 8 while it is still in engagement with the other side of the seat. A small amount of fuel or liquid can now pass between the needle and its seat but instead of a small equally spaced opening as is the case in respect to conventional valves, the opening is all at one side of the needle valve and this opening being larger does not have the tendency to be clogged yet at the same time the opening will permit passage of fuel or liquid in an amount equal or equivalent to that which is permitted to pass through a conventional valve when the same is "cracked" open.

From the foregoing it will therefore be obvious that the sole purpose of the present invention is to provide a valve which provides a safe and efficient close control for the passage of liquid therethrough.

I have found that the above enumerated results can be accomplished through structures which vary slightly from that heretofore described but in which the principle of operation is identical.

In Figs. 5 and 6 of the drawing one of the modified structures is illustrated. Here the same valve housing A is utilized and in which is rotatably mounted the same threaded major valve shaft portion B and its reduced extending portion 9 having the head 10 with the conical or needle end 11. In this instance however the reduced valve stem portion 9 is co-axial with the main stem portion as is also the axis of the head 10 and the needle 11. The variance in construction in this instance over the form of valve previously described resides in the orifice and the tapered valve seat. In this instance the orifice is designated as D' and the tapered valve seat as 8$^a$. The axes or centers of the outlet orifice and the tapered valve seat are eccentric to the axis of the needle 11 and its axis of rotation. The axis of the needle 11, the valve stem portion 9 and the major valve stem portion B is designated at 14 while the axis of the orifice and the valve seat is designated at 15.

When this valve is completely closed the reduced stem portion 9 becomes slightly bowed and when the valve is "cracked" open it assumes a position identical to that illustrated in Fig. 2 of the drawing, as heretofore described. The outlet passage around the needle valve is all at one side thereof as indicated at 16.

Fig. 7 illustrates a further modified form of construction for accomplishing the same results accomplished by the constructions hereinbefore described. In this instance an eccentric motion of the valve head 10 and the conical needle-like end 11 thereof is accomplished by bending or bowing the reduced valve stem portion 9$^a$ so that the axis 17 of the needle point is eccentric to the axis 18 of the main valve stem B which is also the axis of rotation of the valve stem. It will be obvious that as the valve stem is rotated the conical end or needle of the valve will be given an eccentric motion. With this structure a valve housing of the construction appearing in Fig. 1 is used in which the center or axis of the discharge opening D and of the tapered valve seat 8 is co-axial with the axis 18 of the main valve stem portion 2.

I claim:

1. An improved arrangement of an ordinary tapered valve and tapered valve seat, comprising a housing provided at one end with a valve seat, a revolvable valve stem carrying a tapered valve said valve stem being rotatably mounted in said housing for moving the said tapered valve towards and away from said valve seat, said tapered valve arranged out of axial alignment with said valve seat, whereby said valve when rotated to open and closed positions causes a scouring action on different parts of said valve seat and said valve to prevent accumulation of foreign matter on either, said valve engaging different parts of said tapered valve seat when the valve is opened and closed.

2. An improved arrangement of an ordinary tapered valve and ordinary tapered valve seat, comprising an elongated housing and an elongated valve stem within said housing, said valve stem revolvable therein, said stem and housing having near their outer ends engaging screw-threads, the other end of the said valve stem being reduced and projecting in the said housing and carrying at its inner end a tapered valve, the inner end of the said housing having a valve seat tapered correspondingly with the taper of the said valve, the valve seat having an opening, said extension of the valve stem between its screwthreads and the said valve being arranged eccentric with the axis of the outer end of the stem, whereby the valve is eccentric also to the said valve seat, whereby the said valve when rotated to open and closed position engages different parts of the said valve seat causing a scouring action thereon for the purpose of preventing an accumulation of foreign matter on either the valve or valve seat.

3. An improved arrangement of an ordinary tapered valve and an ordinary tapered valve seat comprising an elongated housing, an elongated valve stem passing through said housing, said housing and valve stem having near their outer ends engaging screw-threads, said housing having an outlet opening at its inner end, a tapered valve seat, said valve stem carrying at its inner end a valve tapered to correspond with the taper of the valve seat, said valve stem being reduced in size between the screw-threads and the valve at its inner end, said stem normally bent to cause the valve to normally assume a position eccentric to the said valve seat whereby when the valve stem is rotated to cause the closing or opening of the valve a scouring action occurs between the said valve and valve stem throughout different parts of the stem and seat during rotation, for the purpose set forth.

RUDOLPH HOFFMAN.